US009954754B2

United States Patent
Kwak et al.

(10) Patent No.: US 9,954,754 B2
(45) Date of Patent: Apr. 24, 2018

(54) RANDOM ACCESS METHOD AND TERMINAL SUPPORTING THE SAME

(71) Applicants: Electronics and Telecommunications Research Institute, Daejeon (KR); KOREA ADVANCED INSTITUTE OF SCIENCE AND TECHNOLOGY, Daejeon (KR)

(72) Inventors: Byung-Jae Kwak, Daejeon (KR); June-Koo Rhee, Seongnam-si (KR); Junhyuk Kim, Daegu (KR); Kyounghye Kim, Seoul (KR)

(73) Assignees: Electronics and Telecommunications Research Institute, Daejeon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 96 days.

(21) Appl. No.: 14/928,473

(22) Filed: Oct. 30, 2015

(65) Prior Publication Data

US 2016/0128103 A1 May 5, 2016

(30) Foreign Application Priority Data

Oct. 31, 2014 (KR) .................. 10-2014-0150654
Jan. 9, 2015 (KR) .................. 10-2015-0003576
May 11, 2015 (KR) .................. 10-2015-0065128
Oct. 29, 2015 (KR) .................. 10-2015-0151050

(51) Int. Cl.
*H04W 4/00* (2018.01)
*H04L 12/26* (2006.01)
*H04W 74/08* (2009.01)

(52) U.S. Cl.
CPC ......... *H04L 43/10* (2013.01); *H04W 74/0816* (2013.01)

(58) Field of Classification Search
CPC ..................... H04L 43/10; H04W 74/0816
USPC ............................................. 370/328
See application file for complete search history.

(56) References Cited

U.S. PATENT DOCUMENTS

| 6,657,962 B1 * | 12/2003 | Barri ............... H04L 47/10 370/235 |
| 7,260,081 B2 | 8/2007 | Lee et al. |
| 2002/0080768 A1 * | 6/2002 | Garcia-Luna-Aceves ......... H04W 74/06 370/349 |

(Continued)

FOREIGN PATENT DOCUMENTS

| KR | 100594098 B1 | 6/2006 |
| KR | 1020150007118 A | 1/2015 |

OTHER PUBLICATIONS

Byung-Jae Kwak et al., "Updates on the random access scheme for PAC with simulations", IEEE P802.15 Working Group for Wireless Personal Area Networks (WPANs), May 2015, pp. 1-14.

(Continued)

*Primary Examiner* — Sai Ming Chan
(74) *Attorney, Agent, or Firm* — William Park & Associates Ltd.

(57) ABSTRACT

Provided are a random access method and a terminal supporting the random access method. The terminal may monitor a state of a channel, when the state of the channel is idle, attempt a packet transmission at a first packet transmission probability, and transmit a packet including the first packet transmission probability.

18 Claims, 4 Drawing Sheets

(56) References Cited

U.S. PATENT DOCUMENTS

| | | | |
|---|---|---|---|
| 2005/0013303 A1* | 1/2005 | Gopalakrishnan | H04L 1/0003 370/395.21 |
| 2005/0111379 A1 | 5/2005 | Kim et al. | |
| 2006/0133293 A1* | 6/2006 | Pan | H04L 43/0847 370/252 |
| 2006/0167965 A1* | 7/2006 | Black | H04L 41/12 709/200 |
| 2008/0101308 A1* | 5/2008 | Gaur | H04W 74/0816 370/338 |
| 2009/0086706 A1 | 4/2009 | Huang et al. | |
| 2010/0284282 A1* | 11/2010 | Golic | H04L 43/022 370/242 |
| 2013/0044657 A1* | 2/2013 | Oh | H04W 74/0875 370/310 |
| 2013/0163575 A1 | 6/2013 | Etri | |
| 2013/0304396 A1* | 11/2013 | Walston | G01V 5/0091 702/30 |
| 2016/0044724 A1* | 2/2016 | Seo | H04W 74/0833 370/329 |

OTHER PUBLICATIONS

Byung-Jae Kwak et al., "Text proposal for the random access scheme for CAP and Peering Period", IEEE P802.15 Working Group for Wireless Personal Area Networks (WPANs), Sep. 2015, pp. 1-8.

Byung-Jae Kwak et al., "Random access scheme for CAP and Peering Period", IEEE P802.15 Working Group for Wireless Personal Area Networks (WPANs), Sep. 2015, pp. 1-8.

Byung-Jae Kwak et al., "Adaptive Random Access Scheme for PAC," IEEE P802.15 Working Group for Wireless Personal Area Networks (WPANs), Nov. 2014, pp. 1-14.

Byung-Jae Kwak et al., "On the optimization of the random access scheme for PAC", IEEE P802.15 Working Group for Wireless Personal Area Networks (WPANs), May 2015, pp. 1-18.

* cited by examiner

RANDOM ACCESS METHOD AND TERMINAL SUPPORTING THE SAME

CROSS-REFERENCE TO RELATED APPLICATION

This application claims priority to and the benefit of Korean Patent Application Nos. 10-2014-0150654, 10-2015-0003576, 10-2015-0065128, and 10-2015-0151050 filed in the Korean Intellectual Property Office on Oct. 31, 2014, Jan. 9, 2015, May 11, 2015, and Oct. 29, 2015, respectively, the entire contents of which are incorporated herein by reference.

BACKGROUND OF THE INVENTION (a) Field of the Invention

The present invention relates to a random access method and a terminal supporting the random access method.

(b) Description of the Related Art

CSMA/CA (Carrier Sense Multiple Access/Collision Avoidance) is used in a wireless local area network (WLAN) (Wireless LAN). CSMA/CA is contention-based medium access control that is simple and is easily implemented, and thus it is widely used in a communication system that uses a broadcasting channel such as a wireless communication.

When many terminals are in a network or a network environment changes over time, such a random access has a drawback that causes a deterioration of performance. For example, a DCF (Distributed Coordination Function) used in the wireless local area network (WLAN) has a drawback that if the number of terminals increases in the network, a collision probability increase between data packets, which deteriorates a data rate. Meanwhile, p-persistent CSMA may be optimized in a given specific network environment, whereas the p-persistent CSMA has a drawback that if the network environment changes, a deterioration of performance occurs.

Another drawback of the conventional random access is that although some of the terminals present in the same network transmit a great amount of data, whereas other terminals may transmit only a remarkably small amount of data. That is, fairness between terminals may not be secured.

SUMMARY OF THE INVENTION

The present invention has been made in an effort to provide a random access method having advantages of preventing a deterioration of performance from occurring even in a change of network environment.

The present invention has been also made in an effort to provide a random access method having advantages of providing fairness to terminals that belong to the same network.

An exemplary embodiment of the present invention provides a random access method performed by a terminal. The random access method includes monitoring a state of a channel; when the state of the channel is idle, attempting a packet transmission at a first packet transmission probability; and transmitting a packet comprising the first packet transmission probability.

The random access method may further include: updating the first packet transmission probability.

The updating may include: updating the first packet transmission probability such that an average transmission rate of a network to which the terminal belongs is maintained uniform.

The updating may include: updating the first packet transmission probability by using an average inter-arrival time measured through packets received from neighboring terminals of the terminal and a predetermined target inter-arrival time.

The updating may include: updating the first packet transmission probability by using the average inter-arrival time, the target inter-arrival time, and a first factor determined through a packet transmission probability included in the packets received from neighboring terminals of the terminal.

The average inter-arrival time may be determined by an inter-arrival time with respect to two packets finally received by the terminal.

The first factor may be determined by the packet transmission probability and a length of the received packet.

The updating may include decreasing the first packet transmission probability when the average inter-arrival time is smaller than the target inter-arrival time; and increasing the first packet transmission probability when the average inter-arrival time is greater than the target inter-arrival time.

The updating may include: updating the first packet transmission probability such that the first packet transmission probability is converged to an average packet transmission probability that is an average of packet transmission probability of neighboring terminals of the terminal.

The first packet transmission probability may be differently set according to a length of the packet transmitted by the terminal.

The first packet transmission probability may be differently set according to transmission power with respect to the packet transmitted by the terminal.

The first packet transmission probability may be differently set according to a MCS (modulation and coding scheme) of the terminal.

Another embodiment of the present invention provides a random access method performed by a terminal. The random access method includes monitoring whether a state of a channel is idle or busy; determining a first packet transmission probability that is a probability that the terminal transmits a packet; and attempting a packet transmission at the first packet transmission probability, wherein the first packet transmission probability is determined by an average inter-arrival time calculated from a receiving packet received by the terminal, a predetermined target inter-arrival time, and a first factor calculated from a packet transmission probability included in the receiving packet.

The average inter-arrival time may be determined according to an Equation shown below, $$T_M = \beta_T \cdot T_M + (1-\beta_T) \cdot (\text{inter-arrival time of two finally received packets})$$

wherein $T_M$ denotes the average inter-arrival time, and $\beta_T$ is a real number satisfying $0 < \beta_T < 1$.

The first packet transmission probability may be determined by the average inter-arrival time, the target inter-arrival time, the first factor, and a second factor calculated from a length of the receiving packet.

The determining may include decreasing the first packet transmission probability when the average inter-arrival time is smaller than the target inter-arrival time; and increasing the first packet transmission probability when the average inter-arrival time is greater than the target inter-arrival time.

Yet another embodiment of the present invention provides a terminal. The terminal includes an RF module transmitting or receiving a packet through a channel; and a processor monitoring whether a state of a channel is idle, determining a first packet transmission probability that is a probability of transmitting a packet, and attempting the packet transmission at the first packet transmission probability, wherein the first packet transmission probability is determined by an average inter-arrival time calculated from a receiving packet received through the RF module, a predetermined target inter-arrival time, and a second packet transmission probability included in the receiving packet.

The first packet transmission probability may be determined by the average inter-arrival time, the target inter-arrival time, the second packet transmission probability, and a length of the receiving packet.

The processor may decrease the first packet transmission probability when the average inter-arrival time is smaller than the target inter-arrival time, and increase the first packet transmission probability when the average inter-arrival time is greater than the target inter-arrival time.

A transmission packet transmitted through the RF module may include the first packet transmission probability.

According to an exemplary embodiment of the present invention, a deterioration of performance may be minimized even in a change in a network environment.

According to another exemplary embodiment of the present invention, a random access method of transmitting a packet between terminals fairly may be provided.

DETAILED DESCRIPTION OF THE EMBODIMENTS

Figure 1:
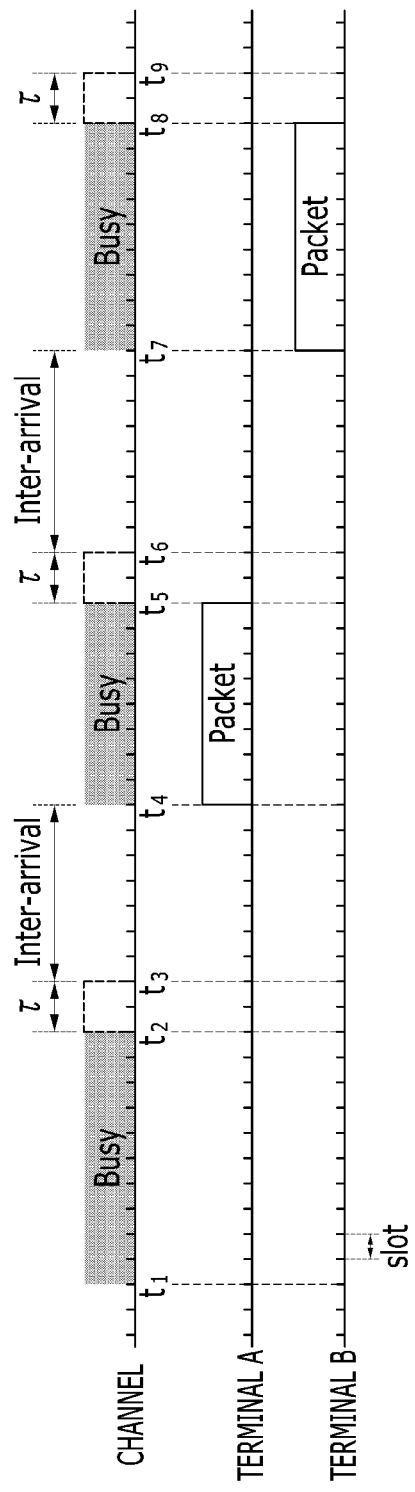
FIG. 1 is a diagram for describing a case where terminals operate using a random access method according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be referred to as a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include functions of all or a part of the terminal, the MT, the AMS, the HR-MS, the SS, the PSS, the AT, the UE, etc.

The base station (BS) may be referred to as an advanced base station, (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) that serves as a base station, a high reliability relay station (HR-RS) that serves as a base station, etc., and may include functions of all or a part of the ABS, the nodeB, the eNodeB, the AP, the RAS, the BTS, the MMR-BS, the RS, the HR-RS.

A random access method and a terminal supporting the random access method according to an exemplary embodiment of the present invention will be described below. Throughout the specification, it is assumed that terminals use a contention-based channel access method. It is assumed that a time resource is divided into time units such as slots, and terminals may transmit packets at the time when slots start. In general, a length of a packet transmitted by terminals is greater than that of a slot. Therefore, packets may be transmitted during a period of time corresponding to several slots.

FIG. 1 is a diagram for describing a case where terminals operate using a random access method according to an exemplary embodiment of the present invention. That is, FIG. 1 illustrates an example in which two terminals A and B operate using the random access method, wherein a minimum gradation indicates a slot.

Figure 2:
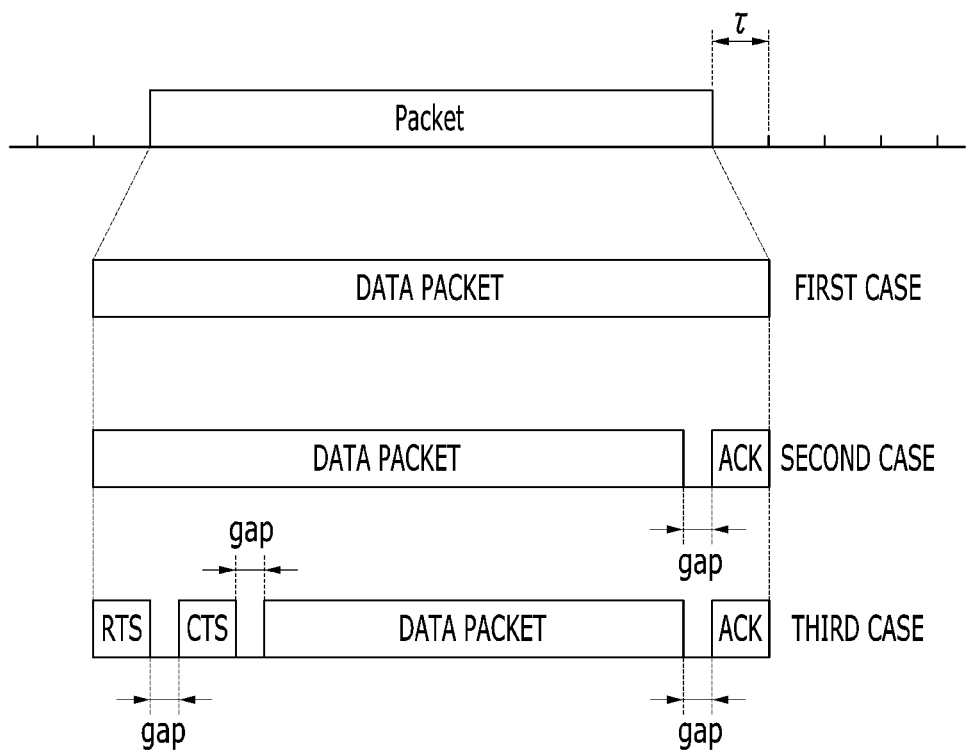
FIG. 2 is a diagram of an example of a packet according to an exemplary embodiment of the present invention.

A "packet" shown in FIG. 1 is a packet transmitted by a terminal and includes not only a data packet but also a control packet necessary for data transmission. For example, the "packet" shown in FIG. 1 may include the following cases as shown in FIG. 2. FIG. 2 is a diagram of an example of a packet according to an exemplary embodiment of the present invention.

In a first case, only a data packet is transmitted. In a second case, the data packet is transmitted, and a terminal that receives the transmitted packet transmits ACK. In a third case, a RTS (Request to Send) packet, a CTS (Clear to Send) packet, the data packet, and ACK are transmitted. That is, in the third case, a transmission terminal and a receiving terminal transmit the RTS and the CTS before transmitting the data packet and the ACK. Meanwhile, in FIG. 2, a time gap (indicated as a gap in FIG. 2) between a control packet and another control packet or a control packet and a data packet may be smaller than $\tau$.

The random access method according to an exemplary embodiment of the present invention will be described below by using the operations of the terminals A and B of FIG. 1. Although several terminals are present in a network, FIG. 1 shows an example of operations of the two terminals A and B among the terminals included in the network and describes the two terminals A and B as an example for convenience of description.

Figure 3:
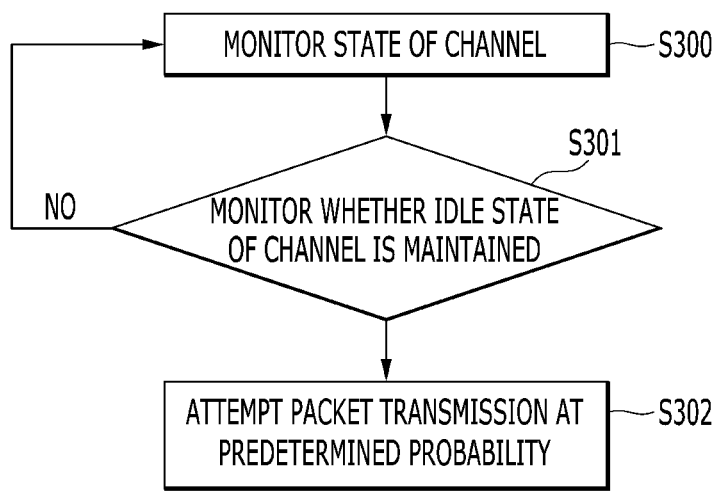
FIG. 3 is a flowchart of a random access method according to an exemplary embodiment of the present invention.

FIG. 3 is a flowchart of a random access method according to an exemplary embodiment of the present invention.

The terminals A and B monitor a state (busy or idle) of a channel before transmitting packets (S300). That is, the terminals A and B monitor whether the channel is used by another terminal (i.e., whether the channel is busy). For example, as shown in FIG. 1, since the channel is in a busy state between time t1 and t2, the terminals A and B transmit no packet and monitor the channel. That is, the terminals A and B wait until the channel is in an idle state while monitoring the channel.

In the time t2, the channel is in the idle state. In this regard, the terminals A and B monitor whether the channel maintains the idle state until a time t3 (S301). If the channel does not maintain the idle state until the time t3 (i.e. during $\tau$), the terminals A and B determine that a packet transmission is not completed and wait until the channel is in the idle state (S301 and S300). If the channel maintains the idle state until the time t3, an operation S302 is performed. Although it is assumed that a length of $\tau$ is 2 times the length of a slot in FIG. 1, $\tau$ may have a different length.

When the channel maintains the idle state, the terminals A and B attempt the packet transmission at a predetermined probability (S302). When the channel maintains the idle state until the time t3 in FIG. 1, the terminals A and B attempt the packet transmission at the predetermined probability immediately in a next slot. That is, in the next slot of the time t3, the terminal A may transmit a packet at a probability Pa and may not transmit the packet at a probability 1-Pa. In the next slot of the time t3, the terminal B may transmit a packet at a probability Pb and may not transmit the packet at a probability 1-Pb. In this regard, the packet transmission probability Pa of the terminal A and the packet transmission probability Pb of the terminal B may be different.

The terminals A and B repeat the operation S302 until the channel is in a busy state if the channel maintains the idle state. If at least one of the terminals in the network starts transmission and the channel is in the busy state, the terminals A and B return to the operation S300 and monitor the channel.

FIG. 1, the terminal A starts the packet transmission in a time t4. In this regard, the terminal A transmits a packet including a value of a packet transmission probability p. The terminal B that has detected the transmission of the terminal A detects that the channel is in the busy state and returns to the operation S300 and waits until the channel is in the idle state.

In FIG. 1, the terminal A completes the transmission and thus the channel is in the idle state again in a time t5. The terminal B monitors whether the channel maintains the idle state until a time t6 (i.e. during τ). As shown in FIG. 1, the channel maintains the idle state until the time t6. Therefore, the terminals A and B attempt the packet transmission at a predetermined probability like operation S302. The terminal B starts the packet transmission in a time t7. In this regard, the terminal B transmits a packet including the value of the packet transmission probability p.

The terminal B completes the packet transmission in a time t8. The terminal A monitors whether the channel maintains the idle state until a time t9. Since the channel maintains the idle state until the time t9, the terminals A and B attempt the packet transmission in each slot at a predetermined probability.

The terminals according to an exemplary embodiment of the present invention follow the random access method described with reference to FIGS. 1 and 3 above. In this regard, the terminals update the packet transmission probability p in arbitrary idle slots thereof. In this regard, a principle that the terminals update the packet transmission probability p according to an exemplary embodiment of the present invention is as follows.

If terminals that belong to a network determine that an average packet transmission rate of terminals of the network to which the terminals belong is too high, the terminals decrease the packet transmission probability p thereof (a first rule). If terminals that belong to a network determine that an average packet transmission rate of terminals of the network to which the terminals belong is too low, the terminals increase the packet transmission probability p thereof (a second rule).

The random access method according to an exemplary embodiment of the present invention follows the first and second rules, thereby maintaining an entire packet transmission rate uniform in a network irrespective of the number of terminals included in the network.

An average inter-arrival time of packets may be used as a determination reference used by the terminals to change a value of the packet transmission probability p. In this regard, the average inter-arrival time of packets corresponds to an idle section of a channel between two received packets and corresponds to an idle time. The inter-arrival time of packets is indicated as 'Inter-arrival' in FIG. 1. In a case where a measured inter-arrival time of average packets is $T_M$ and an inter-arrival time of target packets is $T_T$, the terminals update the packet transmission probability p thereof such that $T_M$ may be converged to $T_T$.

The terminals according to an exemplary embodiment of the present invention update $T_M$ using Equation 1 below if receiving packets.

$$T_M = f_1(T_M, \text{inter-arrival time of two finally received packets}) \quad \text{(Equation 1)}$$

In Equation 1 above, $f_1(a,b)$ denotes a function of a and b. An arbitrary function capable of estimating $T_M$ through the measured inter-arrival time may be used as function $f_1$. Equation 2 below shows an example of function $f_1$.

$$T_M = \beta_T \cdot T_M + (1-\beta_T) \cdot (\text{inter-arrival time of two finally received packets}) \quad \text{(Equation 2)}$$

In Equation 2 above $\beta_T$ denotes a real number satisfying $0 < \beta_T < 1$.

Meanwhile, to improve fairness of terminals, a method in which the terminals compare the packet transmission probability p thereof and an average packet transmission probability of neighboring terminals and allow the packet transmission probability p thereof to be converged to the average packet transmission probability of the neighboring terminals may be used. That is, the terminals may update the packet transmission probability p thereof such that the packet transmission probability p thereof may be converged to the average packet transmission probability of the neighboring terminals. The terminals may update the packet transmission probability p thereof in order to achieve the following two objectives for the fairness between the terminals. It is a first objective for the terminals to converge $T_M$ to $T_T$. It is a second objective for the terminals to converge the packet transmission probability p thereof to the average packet transmission probability of the neighboring terminals.

A method in which the terminals allow the packet transmission probability p thereof to be converged to the average packet transmission probability of the neighboring terminals will be described below. The terminals update Q for each slot as shown in Equation 3 below.

$$Q = \beta_Q \cdot Q + (1-\beta_Q) \cdot J \quad \text{(Equation 3)}$$

In Equation 3, J denotes a probability random variable and is defined as shown in Equation 4 below.

$$J = \begin{cases} 0 & \text{In the case where a current slot is in an idle state;} \\ 0 & \text{In the case where collision occurs in the current slot;} \\ \frac{1}{p}\ln\frac{1}{p} & \begin{array}{l}\text{In the case where a packet is received ($p$ denotes a}\\ \text{packet transmission probabilty of a transmission}\\ \text{terminal included in the received packet)}\end{array} \end{cases} \quad \text{(Equation 4)}$$

In Equation 3 above, $\beta_Q$ satisfies.

The terminals according to an exemplary embodiment of the present invention update R for each slot using Equation 5 below.

$$R = \beta_Q \cdot R + (1-\beta_Q) \cdot K \quad \text{(Equation 5)}$$

$\beta_Q$ of Equation 5 is the same value as $\beta_Q$ of Equation 3. K of Equation 5 is a probability variable defined as follows.

$$K = \begin{cases} 0 & \text{In the case where a current slot is in an idle state;} \\ 0 & \text{In the case where collision occurs in the current slot;} \\ \frac{1}{p} & \text{In the case where a packet is received ($p$ denotes a packet transmission probabilty of a transmission terminal included in the received packet)} \end{cases} \quad \text{(Equation 6)}$$

The terminals update a value of the packet transmission probability p thereof by using values of Q and R updated using Equations 3 and 5, the current packet transmission probability p thereof, the average inter-arrival time $T_M$ of the neighboring terminals, and the target inter-arrival time $T_T$. Table 1 shows the updated values of the packet transmission probability p thereof as described above.

TABLE 1

|  | $\ln\frac{1}{p} < \frac{Q}{R} - \Delta_1$ | $\frac{Q}{R} - \Delta_1 < \ln\frac{1}{p} < \frac{Q}{R}$ | $\frac{Q}{R} < \ln\frac{1}{p} < \frac{Q}{R} + \Delta_2$ | $\frac{Q}{R} + \Delta_2 < \ln\frac{1}{p}$ |
|---|---|---|---|---|
| $T_M < T_T - \tau_1$ | $p := c_{11} \cdot p$ | $p := c_{12} \cdot p$ | $p := c_{13} \cdot p$ | $p := c_{14} \cdot p$ |
| $T_T - \tau_1 < T_M < T_T$ | $p := c_{21} \cdot p$ | $p := c_{22} \cdot p$ | $p := c_{23} \cdot p$ | $p := c_{24} \cdot p$ |
| $T_T < T_M < T_T + \tau_2$ | $p := c_{31} \cdot p$ | $p := c_{32} \cdot p$ | $p := c_{33} \cdot p$ | $p := c_{34} \cdot p$ |
| $T_T + \tau_2 < T_M$ | $p := c_{41} \cdot p$ | $p := c_{42} \cdot p$ | $p := c_{43} \cdot p$ | $p := c_{44} \cdot p$ |

In Table 1 above, $c_{ij}$ (i=1,2,3,4 and j=1,2,3,4) is a real number greater than 0 (zero). If the real number is smaller than 1, p is smaller after being updated. If the real number is greater than 1, p is further greater after being updated.

If the terminals extremely often updates p thereof, stability may deteriorate since the terminals are sensitively influenced by an instanoues status change in a network. To the contrary, if an update frequency of time of p is too low, the status change in the network may not be effectively followed. To solve this problem, p may be updated every time one packet is received.

Equations 3, 4, 5, and 6 are used to update Q and R for each slot, which may be inefficient in terms of implemenation. To solve this problem, instead of updating Q and R for each slot, a method of updating Q and R every time a packet is received, and updating p also using the updated Q and R every time the packet is received may be used. To this end, Q and R may be updated when a packet is received using Equations 7 and 8 below, instead of Equations 3 and 5.

$$Q = \beta_Q^n \cdot Q + (1 - \beta_Q) \cdot J \quad \text{(Equation 7)}$$

$$R = \beta_Q^n \cdot R + (1 - \beta_Q) \cdot K \quad \text{(Equation 8)}$$

In Equations 7 and 8 above, n may be a number of summing the number of idle slots and the number of slots in which collision occurs until the packet is received.

When $\beta_Q$ is a number very close to 1, approximate Equations 9 and 10 below may be used, instead of Equations 7 and 8 above.

$$Q = (1 - n + n\beta_Q) \cdot Q + (1 - \beta_Q) \cdot J \quad \text{(Equation 9)}$$

$$R = (1 - n + n\beta_Q) \cdot R + (1 - \beta_Q) \cdot K \quad \text{(Equation 10)}$$

Another method in which the terminals update p will now be described below.

The terminals update Q and R if receiving packets. In this regard, a method of updating Q may use Equation 11 below, and a method of updating R may use Equation 12 below.

$$Q = \beta_1 \cdot Q + (1 - \beta_1) \cdot \frac{1}{\gamma_k} \quad \text{(Equation 11)}$$

$$R = \beta_2 \cdot R + (1 - \beta_2) \cdot \frac{1}{p_k \cdot \gamma_k} K \quad \text{(Equation 12)}$$

In Equation 12 above, $p_k$ denotes a value of p included in a Kth received packet, and $\gamma_k$ is defined as shown in Equation 13 below.

$$\gamma_k = \left(\frac{l_k}{l_{basic}}\right)^{-\frac{1}{2}} \quad \text{(Equation 13)}$$

In Equation 13 above, $l_k$ denotes a length of the Kth received packet, and $l_{basic}$ denotes a length of a reference packet.

When the packet is received, the terminals update p using the updated Q and R by Equations 11 and 12, by using a method defined in Table 2 below.

TABLE 2

|  | $p < \frac{Q}{R} \cdot \frac{1}{f_1}$ | $\frac{Q}{R} \cdot \frac{1}{f_1} < p < \frac{Q}{R}$ |
|---|---|---|
| $T_M < T_T - \tau_1$ | $p := d_{11} \cdot p$ | $p := d_{12} \cdot p$ |
| $T_T - \tau_1 < T_M < T_T$ | $p := d_{21} \cdot p$ | $p := d_{22} \cdot p$ |
| $T_T < T_M < T_T + \tau_2$ | $p := d_{31} \cdot p$ | $p := d_{32} \cdot p$ |
| $T_T + \tau_2 < T_M$ | $p := d_{41} \cdot p$ | $p := d_{42} \cdot p$ |
|  | $\frac{Q}{R} < p < \frac{Q}{R} \cdot f_2$ | $\frac{Q}{R} \cdot f_2 < p$ |
| $T_M < T_T - \tau_1$ | $p := d_{13} \cdot p$ | $p := d_{14} \cdot p$ |
| $T_T - \tau_1 < T_M < T_T$ | $p := d_{23} \cdot p$ | $p := d_{24} \cdot p$ |
| $T_T < T_M < T_T + \tau_2$ | $p := d_{33} \cdot p$ | $p := d_{34} \cdot p$ |
| $T_T + \tau_2 < T_M$ | $p := d_{43} \cdot p$ | $p := d_{44} \cdot p$ |

In Table 2 above, $d_{ij}$ (i=1,2,3,4 and j=1,2,3,4) is a real number greater than 0 (zero). If the real number is smaller than 1, p is smaller after being updated. If the real number is greater than 1, p is further greater after being updated. In Table 2 above, $f_1$ and $f_2$ are real numbers greater than 1.

One of methods of optimizing the random access method according to an exemplary embodiment of the present invention according to a network status uses a value of $T_T$.

For example, if a small value is selected as the value of $T_T$, an average value of p of the terminals increases, and thus a collision probability of the transmitted packet increases. To the contrary, if a great value is selected as the value of $T_T$, an average value of p of the terminals decreases, and thus the collision probability of the transmitted packet decreases but a probability in which a channel is wasted in an idle state increases. Therefore, it is necessary for selecting the value of $T_T$ as an appropriate value according to a statistical characteristic with respect to a length of the transmitted packet, the number of terminals included in the network, etc.

Meanwhile, in a network environment in which a length of a packet transmitted by each terminal is extremely various or a statistical characteristic of the length of the packet changes over time, resource efficiency may be reduced according to a status. To solve this problem, the terminals may differently set a transmission probability of a corresponding packet according to the length of the packet. For example, when a packet length that is reference (hereinafter referred to as "reference packet length") is set, and a value of $T_T$ that is optimized to the reference packet length is selected, the access method according to an exemplary embodiment of the present invention described above is applied, and thus the packet transmission probability may be converged to a value optimized to the reference packet length. If a length of a packet that is to be transmitted by a predetermined terminal is greater than the reference packet length, the terminal transmits the packet not by using the packet transmission probability p thereof but by using a different transmission probability. For example, if the length of the packet that is to be transmitted is be r times greater than the reference packet length, the corresponding packet may be transmitted at a packet transmission probability p/g(r), other than the packet transmission probability p. In this regard, g(r) denotes a function of r, and g(r)=r or g(r)= $\sqrt{r}$ may be used. Even when p/g(r) is used as the packet transmission probability instead of p, the packet transmission probability included in the packet is p, and a value updated using Table 2 is also p. At the time of the transmission of the packet, the terminal may transmit the packet including the packet transmission probability p and r that is a ratio of the length of the transmission packet and the reference packet length.

As described above, when a packet is transmitted at p/g(r) instead of the packet transmission probability p, an inter-arrival time between the transmitted packet and a packet may be different. Accordingly, an estimation value of $T_M$ may also be different. To solve this problem, in case where g(r)≠1, it is necessary to also change an equation used to update $T_M$. That is, Equation 14 below may be used instead of Equation 1 above.

$T_M = f_1(T_M, \text{inter-arrival time of two finally received packets}, g(r))$ (Equation 14)

In Equation 14, $f_1(a,b,c)$ denotes a function of a, b, and c. Equation 15 below shows an example of a function f2.

$T_M = \beta_T \cdot T_M + (1-\beta_T) \cdot (\text{inter-arrival time of two finally received packets})/g(r)$ (Equation 15)

When a terminal uses transmission power control to adjust interference applied to neighboring terminals, the packet transmission probability may be different according to transmit power of a packet. For example, it is assumed that if p indicates the packet transmission probability used to transmit the packet at reference transmission power, the packet is transmitted at transmission power a times stronger than the reference transmission power. In this regard, the corresponding packet may be transmitted at packet transmission probability $$\frac{p}{a^{2/n}}$$

other than the packet transmission probability p. N denotes a path loss exponent of a radio channel.

Meanwhile, a transmission speed is determined by a MCS (modulation and coding scheme) in a communication system. Most communication systems support at least one MCS level. Therefore, in a good channel environment, a high MCS level is used to be capable of a high-rate data transmission, and, in a bad channel environment, a low MCS level is selected to reduce a data transmission speed and increase the reliability of transmission. When a packet is transmitted using a high MCS level, a higher packet transmission probability is used than when the packet is transmitted using a reference MCS level. For example, when a transmission speed of a packet is n times faster than a transmission speed when the reference MCS level is used, the corresponding packet may be transmitted at a packet transmission probability np other than the reference packet transmission probability p.

Figure 4:
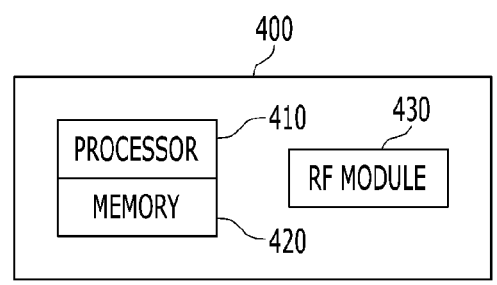
FIG. 4 is a block diagram of a terminal according to an exemplary embodiment of the present invention.

FIG. 4 is a block diagram of a terminal according to an exemplary embodiment of the present invention.

As shown in FIG. 4, a terminal 400 according to an exemplary embodiment of the present invention includes a processor 410, memory 420, and an RF module 430.

The processor 410 may be configured to implement the procedure, the method, and the functions described with reference to FIGS. 1 through 3 above.

The memory 420 is connected to the processor 410 and stores various types of information relating to an operation of the processor 410.

The RF module 430 is connected to an antenna (not shown) and transmits or receives a wireless signal (packet). The antenna may be configured as a single antenna or a multiple antenna (MIMO antenna).

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A random access method performed by a terminal, the random access method comprising:
    monitoring a state of a channel;
    when the state of the channel is idle, attempting a packet transmission at a first packet transmission probability; and
    transmitting a packet including the first packet transmission probability,
    wherein an optimal transmission probability is maintained by updating the first packet transmission probability based upon channel condition, and
    wherein the terminal by itself both transmits the packet and updates the first packet transmission probability.

2. The random access method of claim 1, wherein the updating includes: updating the first packet transmission probability such that an average transmission rate of a network to which the terminal belongs is maintained uniform.

3. The random access method of claim 1, wherein the updating includes: updating the first packet transmission probability by using an average inter-arrival time measured through packets received from neighboring terminals of the terminal and a predetermined target inter-arrival time.

4. The random access method of claim 3, wherein the updating includes: updating the first packet transmission probability by using the average inter-arrival time, the target inter-arrival time, and a first factor determined through a packet transmission probability included in the packets received from neighboring terminals of the terminal.

5. The random access method of claim 3, wherein the average inter-arrival time is determined by an inter-arrival time with respect to two packets finally received by the terminal.

6. The random access method of claim 4, wherein the first factor is determined by the packet transmission probability and a length of the received packet.

7. The random access method of claim 3, wherein the updating includes:
decreasing the first packet transmission probability when the average inter-arrival time is smaller than the target inter-arrival time; and
increasing the first packet transmission probability when the average inter-arrival time is greater than the target inter-arrival time.

8. The random access method of claim 1, wherein the updating includes: updating the first packet transmission probability such that the first packet transmission probability is converged to an average packet transmission probability that is an average of packet transmission probability of neighboring terminals of the terminal.

9. The random access method of claim 1, wherein the first packet transmission probability is differently set according to a length of the packet transmitted by the terminal.

10. The random access method of claim 1, wherein the first packet transmission probability is differently set according to transmission power with respect to the packet transmitted by the terminal.

11. The random access method of claim 1, wherein the first packet transmission probability is differently set according to a MCS (modulation and coding scheme) of the terminal.

12. A random access method performed by a terminal, the random access method comprising:
monitoring whether a state of a channel is idle or busy;
determining a first packet transmission probability that is a probability that the terminal transmits a packet; and
attempting a packet transmission at the first packet transmission probability,
wherein the first packet transmission probability is determined by an average inter-arrival time calculated from receiving packets received by the terminal from other terminals, a predetermined target inter-arrival time, and a first factor calculated from a packet transmission probability included in the receiving packet,
wherein an optimal transmission probability is maintained by updating the first packet transmission probability based upon channel condition, and
wherein the terminal by itself both transmits the packet and updates the first packet transmission probability.

13. The random access method of claim 12, wherein the average inter-arrival time is determined according to an Equation below, $$T_M = \beta_T \cdot T_M + (1-\beta_T) \cdot (\text{inter-arrival time of two finally received packets})$$

wherein $T_M$ denotes the average inter-arrival time, and $\beta_T$ is a real number satisfying $0<\beta_T<1$.

14. The random access method of claim 12, wherein the first packet transmission probability is determined by the average inter-arrival time, the target inter-arrival time, the first factor, and a second factor calculated from a length of the receiving packet.

15. The random access method of claim 12, wherein the determining includes:
decreasing the first packet transmission probability when the average inter-arrival time is smaller than the target inter-arrival time; and
increasing the first packet transmission probability when the average inter-arrival time is greater than the target inter-arrival time.

16. A terminal comprising:
an RF module transmitting or receiving a packet through a channel; and
a processor monitoring whether a state of a channel is idle, determining a first packet transmission probability that is a probability of transmitting the packet, and attempting a packet transmission at the first packet transmission probability,
wherein the first packet transmission probability is determined by an average inter-arrival time calculated from receiving packets received from other terminals through the RF module, a predetermined target inter-arrival time, and a second packet transmission probability included in the receiving packet,
wherein an optimal transmission probability is maintained by updating the first packet transmission probability based upon channel condition, and
wherein the terminal by itself both transmits the packet and updates the first packet transmission probability.

17. The terminal of claim 16, wherein the first packet transmission probability is determined by the average inter-arrival time, the target inter-arrival time, the second packet transmission probability, and a length of the receiving packet.

18. The terminal of claim 16, wherein the processor decreases the first packet transmission probability when the average inter-arrival time is smaller than the target inter-arrival time, and increases the first packet transmission probability when the average inter-arrival time is greater than the target inter-arrival time.

* * * * *